United States Patent
Haenle (10) Patent No.: US 10,967,448 B2
(45) Date of Patent: Apr. 6, 2021

(54) ROTARY TOOL

(71) Applicant: GUEHRING KG, Albstadt (DE)

(72) Inventor: Peter Haenle, Wales, WI (US)

(73) Assignee: Guehring KG, Albstadt (DE)

( * ) Notice: Subject to any disclaimer, the term of this patent is extended or adjusted under 35 U.S.C. 154(b) by 0 days.

(21) Appl. No.: 16/379,166

(22) Filed: Apr. 9, 2019

(65) Prior Publication Data

US 2019/0314904 A1 Oct. 17, 2019

(30) Foreign Application Priority Data

Apr. 12, 2018 (DE) ...................... 10 2018 108 765.9

(51) Int. Cl.
*B23D 77/00* (2006.01)
*B23C 5/00* (2006.01)
*B23C 5/04* (2006.01)

(52) U.S. Cl.
CPC .............. *B23D 77/00* (2013.01); *B23C 5/006* (2013.01); *B23C 5/04* (2013.01); *B23C 2222/64* (2013.01); *B23C 2222/88* (2013.01); *B23C 2226/27* (2013.01); *B23D 2277/02* (2013.01)

(58) Field of Classification Search
CPC .... B23D 77/00; B23D 2277/02; B23C 5/006; B23C 5/04
See application file for complete search history.

(56) References Cited

U.S. PATENT DOCUMENTS

| | | | | |
|---|---|---|---|---|
| 2,828,529 | A * | 4/1958 | Bryant | B23B 29/03 407/109 |
| 5,605,420 | A | 2/1997 | Feldsine | |
| 6,120,218 | A * | 9/2000 | Bishop | B23C 5/006 407/34 |
| 8,950,985 | B2 * | 2/2015 | Durand-Terrasson | B23B 29/02 408/186 |

(Continued)

FOREIGN PATENT DOCUMENTS

| | | |
|---|---|---|
| DE | 925142 C | 3/1955 |
| DE | 10305991 A1 | 12/2004 |

(Continued)

OTHER PUBLICATIONS

German Search Report (and translation provided by foreign counsel) from a corresponding German patent application (DE 10 2018 108 765.9) dated Feb. 5, 2019, 13 pages.

(Continued)

*Primary Examiner* — Eric A. Gates
(74) *Attorney, Agent, or Firm* — Burr & Brown, PLLC (57) ABSTRACT

The invention relates to a rotary tool (1; 101; 201; 301; 401) for cutting large inside diameters at the outer circumference (2) of which at least one cutting edge (4; 104; 204) is arranged, comprising a support structure (10; 110; 210; 310; 410) which includes a supporting area (14; 114; 214) which indirectly or directly supports the cutting edge (4; 104; 204), and comprising a chucking portion (24; 124; 224; 324; 424) for coupling to a tool holder, wherein the support structure (10; 110; 210; 310; 410) is designed in light-weight construction and the area (14; 114; 214) of the support structure (10; 110; 210; 310; 410) indirectly or directly supporting the cutting edge (4; 104; 204) is limited regarding thermal expansion by a corset structure (12; 112; 212; 312; 412).

26 Claims, 8 Drawing Sheets

(56) References Cited

U.S. PATENT DOCUMENTS

| | | | |
|---|---|---|---|
| 9,802,259 B2* | 10/2017 | Oettle | ................ B23B 31/02 |
| 2011/0182677 A1* | 7/2011 | Frank | ................ B23C 5/006 |
| | | | 407/46 |
| 2014/0161543 A1 | 6/2014 | Francis et al. | |
| 2019/0099816 A1* | 4/2019 | Zetek | ................ B23C 5/06 |

FOREIGN PATENT DOCUMENTS

| | | |
|---|---|---|
| DE | 102007007399 A1 | 8/2008 |
| DE | 102009042951 B3 | 3/2011 |
| DE | 102017118604 A1 | 2/2018 |
| WO | 2017/177990 A2 | 10/2017 |

OTHER PUBLICATIONS

European Search Report (and translation provided by foreign counsel) from a corresponding European patent application (EP 19 167 914.1) dated Oct. 16, 2019, 11 pages.

* cited by examiner

ROTARY TOOL

TECHNICAL FIELD

The present invention relates to a rotary tool/rotating tool for cutting large inside/inner diameters, at the outer circumference of which at least one cutting edge is arranged, the rotary tool comprising a support structure which has a supporting area that indirectly or directly supports the cutting edge, and comprising a chucking portion for coupling to a tool holder. The chucking portion may take any shape, preferably such shape that it can be coupled to the corresponding spindle of a machine tool via common tool holders such as a hollow-shank taper holder (HSK-taper).

STATE OF THE ART

Especially by the fact that more and more electromotive drives or conventional gearings having a higher number of speeds are required, there is a more urgent problem of high-precision cutting large inside diameters such as e.g. the inside diameter of a stator housing of an electric motor.

Concerning the efficiency of an electric motor, it is of salient importance to exactly comply with predetermined geometric measures due to the interactions between the rotor and the stator. It has turned out that conventional rotationally driven tools are capable of complying with the required narrow manufacturing tolerances, only when the cutting volume is kept appropriately small, as this is the case with a reamer, for example. If, however, the material removal is to be increased to render manufacture more profitable, further problems will arise:

When cutting large inside diameters with appropriately increased material removal and correspondingly higher energies introduced to the tool and to the workpiece, the cutting edges are strongly heated even when they are cooled. These cutting edges in turn transmit the heat via their connection to a support structure of the rotary tool, the same applies to support and, resp., guide strips at the tool body which equally transmit heat into the tool by friction with the workpiece. Since the machining operation is rather time-consuming due to the fact that the surface to be machined is quite large, the support structure is heated and expands corresponding to its thermal expansion coefficient. In addition, the rotary tool for cutting large inside diameters has a considerable volume so that care has to be taken that the weight of the tool does not negatively affect the dimensional stability of machining. Further, the tool must be capable of being safely handled even by the automatic tool changer of the cutting machine.

SUMMARY OF THE INVENTION

Therefore, it is the object of the invention to provide a rotary tool especially for the cutting production of large-diameter boreholes which excels, apart from proper handling, by the fact that dimensional stabilities of the borehole not reached so far can be obtained even when high machining performances are required or the thermal input into the tool during machining would result in high thermal expansion thereof.

The object is achieved with a generic rotary tool according to the invention by the fact that the support structure is designed in light-weight construction and the area of the support structure indirectly or directly supporting the cutting edge is restricted by a corset structure as regards thermal expansion. The supporting area is a portion of the support structure in the environment of the cutting edge which supports the latter indirectly or directly and absorbs the forces occurring at the cutting edge during machining when viewed in the force flux as an upstream area of the support structure. The supporting area and the cutting edge in a way are the main elements of the functional portion of the rotary tool. The support structure meets the requirements of a light-weight construction to minimize the weight and the inertia during rotary machining and of a preferably low-cost manufacture. During heating due to machining, the support structure and especially the supporting area of the support structure expands. According to the invention, the area supporting the cutting edge, viz. the area which is finally decisive for the dimensional stability, is limited as to its expansion due to the corset structure, however. The corset structure has an especially low thermal expansion coefficient so that temperature change results in just very low thermal expansion and, resp., change in geometry which are within a predetermined tolerance of dimensional stability. The corset structure helps to restrict especially the degree of freedom in the radial direction and, in this way, a thermally caused displacement of the cutting edges in the radial direction can successfully be kept within the μm range or can be exactly restricted to few μm, even if the temperature of the cutting edges is very high. Thus, high-precision cutting of components having a large inside diameter is possible.

Advantageous embodiments are claimed in the subclaims and shall be explained in the following.

It is of advantage when the corset structure has a (mean) thermal expansion coefficient (in literature also referred to as a coefficient of linear expansion/expansion coefficient or thermal expansion factor) of less than $$10 \cdot 10^{-6} \frac{1}{K} (10E\text{-}6\ 1/K,\ 10 \times 10^{\wedge}(-6)\ 1/K),$$

especially preferred of less than $$2 \cdot 10^{-6} \frac{1}{K} (2E\text{-}6\ 1/K),$$

and extraordinarily preferred of less than $$7 \cdot 10^{-6} \frac{1}{K}$$

within the temperature range from 0 to 80° C. and especially within the temperature range from 0 to 100° C. Especially preferred, the corset structure has a thermal expansion coefficient of less than $$2 \cdot 10^{-6} \frac{1}{K}$$

even within the temperature range from 0 to 300° C. The particularly low thermal expansion coefficient of the corset structure helps to restrict the change in geometry of the supporting area especially in the radial direction.

Preferred, the corset structure includes as a material Invar and/or titanium and/or nickel and/or a nickel-iron alloy and/or a carbon fiber-reinforced composite material and/or silicon-nitride (Si3N4). Invar is a binary iron-nickel alloy having a particularly low thermal expansion coefficient and is also known under the designation of Invar 36, Nilo alloy 36, Nilvar, Ni 36 or NiLo36. NiLo36 has the material number 1.3912. Even up to temperatures of 500° C. its thermal expansion coefficient ranges below $$10 \cdot 10^{-6} \frac{1}{K}.$$

At the same time, Invar has a tensile strength Rm of about $$500 \frac{N}{mm^2}$$

and an E modulus of about 140 GPa to satisfy the strength requirements of the rotary tool. The corset structure may equally include titanium as a material. Titanium is stretchable as well as resistant to corrosion and temperature and has a thermal expansion coefficient of $$8.2 \cdot 10^{-6} \frac{1}{K}.$$

Appropriate alloys may reach tensile strengths Rm of sometimes far beyond $$800 \frac{N}{mm^2}.$$

In addition, also further nickel alloys such as Ni 47, for example, are suited as a proportional material of the corset structure. Carbon fiber-reinforced plastic (CFRP) is equally suited as material for the corset structure having a direction-dependent thermal expansion. Accordingly, the orientations of the carbon fibers are adapted to the requirements when designing the corset structure and are laid especially in the radial direction or in the circumferential direction so that thermal expansion is restricted in the fiber direction.

In a preferred embodiment, the corset structure may be rotationally symmetric and/or axially symmetric to an axis of rotation of the rotary tool. The rotationally symmetric and/or axially symmetric design with accompanying uniform rotational inertia promotes balanced movement of rotation of the rotary tool as well as adequate uniform load supporting in the radial direction over the entire periphery.

Preferably, the support structure may have a (mean) density of less than $$4 \frac{g}{cm^3}$$

and/or a (mean) thermal expansion coefficient of more than $$10 \cdot 10^{-6} \frac{1}{K}$$

and especially preferred, of more than $$15 \cdot 10^{-6} \frac{1}{K}$$

within the temperature range from 0 to 100° C. The support structure constitutes a large proportion in the rotary tool in terms of volume and thus also in terms of weight. Low weight is required for proper handling as well as for efficient use with improved dimensional stability, as the superimposed active weight force is reduced.

Preferably, the rotary tool may be adapted to cut an inside diameter of more than 200 mm, especially preferred of more than 300 mm and most preferred of more than 400 mm. Said large inside diameters are important for stator housings of electric motors, for example, The rotary tool according to the invention meets, despite large inside diameters, the highest demands to the precision of machining already described in the introductory part which are made due to the high speeds of the electric motor in order to finish cutting the diameter of a main borehole ultimately with an accuracy of few μm.

In a particular embodiment, the rotary tool may be adapted to cut an inside diameter having an axial length of up to 400 mm.

According to a first preferred embodiment, the corset structure is arranged radially inside the support structure and is connected to the support structure, wherein the corset structure predetermines a thermal expansion of the area of the support structure supporting the cutting edge. The corset structure arranged in the radially inner area is geometrically invariant (relatively speaking) vis-à-vis a temperature change with accompanying thermal expansion. The radially outside arranged support structure, on the other hand, and especially the supporting area is geometrically variant (relatively speaking) and strives for performing a thermal expansion, but this thermal expansion is restricted by the radially inside located connected corset structure by force closure and/or form closure. As a consequence, the corset structure predetermines the thermal expansion in the radial direction. Especially the dimension of the corset structure in the radial direction is many times, especially two to twenty times, larger than the dimension of the area supporting the cutting edge so that in total the thermal expansion which is composed of the sum of the thermal expansion of the corset structure having a low thermal expansion coefficient but large dimension and the thermal expansion of the supporting area having a high thermal expansion coefficient but small dimension is minimized. The thermal expansion of the corset structure takes the significant part in the total thermal expansion in the radial direction and thus significantly predetermines the thermal expansion of the support structure in the area of the cutting edge.

Basically, the cutting edge may be positioned in most various ways. When the material of the support structure and, resp., of the supporting area is suitable for forming a hard cutting edge, the at least one cutting edge may be formed directly at the supporting area of the support structure. In this way, the support structure is formed integrally and inexpensively with the at least one cutting edge and mounting of the cutting edge to the support structure is not necessary. The at least one cutting edge may alternatively be formed at a cutting member supported by the supporting area. The cutting member forms a separate body which is especially replaceable and may include material having especially increased hardness that is different from the support structure.

In an advantageous configuration, the cutting member, for example in the form of a cutting insert, may be held in an axially and/or radially adjustable cartridge. The cartridge rests especially directly on or, resp., is embedded in the supporting area. The cutting edge of the cutting member is thus supported indirectly by the supporting area.

In a preferred embodiment, the corset structure may exhibit a disk-shaped or star-shaped structure with respect to an axis of rotation of the rotary tool. The disk-shaped or star-shaped structure the largest geometric dimension of which is perpendicular to the axis of rotation can absorb tensile and/or compressive forces in the radial direction and allows circumferential uniform load supporting in the radial direction. If the support structure expands or contracts by reason of temperature change, it is limited in the radial direction by the tensile and, resp., compressive force of the corset structure (by force and/or form closure). The star-shaped structure requires less material as compared to the disk-shaped structure of the corset structure and thus is lighter.

When the area supporting the cutting edge is connected to a base of the support structure via a radially elastic connecting portion, a durable and yet rigid tool structure is resulting. What is crucial to the dimensional stability for temperature changes is the position of the cutting edge with respect to the axis of rotation and, resp., the rotary cutting circle described by the cutting edge. Said cutting circle is allowed to vary only minimally within the dimensional stability and, resp., within defined tolerances. Therefore, uncoupling of the supporting area from the cutting edges and the base of the support structure must be configured to a defined extent. The degree of freedom of thermal expansion of the base in the radial direction is not limited, in contrast to the supporting area. Each of the supporting area and the base can independently perform, when being heated, thermal expansion in the radial direction, wherein a forced thermal expansion constraining tension is reduced by the radially elastic connecting portion. Nevertheless, it has shown that the radially elastic connecting portion does not affect machining and a rigid tool structure continues to be provided.

In a preferred embodiment, the base of the support structure may be cup-shaped and the radially elastic connecting portion of the support structure may include an inner circumferential groove and/or an outer circumferential groove. The base in cup shape, preferably being rotationally symmetric, has a high resistance moment vis-à-vis torsion and can be adapted for torque transmission while material that is not required is saved and simultaneously weight is reduced. The material recesses of the groove permit a radially elastic deformation of the connecting portion. In the case of more than one groove, the at least one inner circumferential groove and/or outer circumferential groove are offset against each other in the axial direction of the axis of rotation of the rotary tool. By fixing the number and the arrangement of the grooves relative to each other, a radially elastic connecting area in accordance with the requirements of the rotary tool can be designed. In particular, the at least one inner circumferential groove and the at least one outer circumferential groove alternate in the axial direction so that a W-shape or a sawtooth structure is formed.

As a matter of course, the support structure has to be connected radially tightly to the corset structure. As regards the connecting technique, all common variants are available. Especially, also an integral connection may be chosen by imprinting the support structure onto the corset structure (or vice versa), for example. Apart from a non-positive connection or a positive connection, also an adhesive connection by e.g. welding, bonding or imprinting may be used for connecting the corset structure to the support structure.

Of preference, the corset structure can be connected to the support structure via at least one screwed connection in the radial direction, viz. whenever a degree of shrinkage is smaller than the thermal expansion occurring in the support structure during tool operation. The screwed connection and, resp., the screws in the radial direction, preferably arranged circumferentially uniformly, connect the area supporting the cutting edge rigidly (positively and/or non-positively) to the corset structure. Via the screwed connection, a tensile force of the supporting area in the radial direction, which occurs due to different thermal expansions of the corset structure and the support structure, may be absorbed and the elastic deformation of the supporting area caused by the temperature may be limited.

In a preferred variant, the support structure may be shrink-fitted onto the corset structure. In this variant, the support structure is heated or elastically deformed and widened so that the (maximum partial) inner diameter of the support structure becomes larger than or equal to the (maximum partial) outer diameter of the corset structure. After that, the two structures are mounted and connected to each other. The force of elastic deformation is removed and, resp., the support structure is cooled to room temperature again so that the support structure braces relative to the corset structure and is shrink-fitted. In addition, or alternatively, also the corset structure can be cooled before being mounted. In particular, with a temperature increase of 25° C. approx. 66% of the thermal expansion of the support structure are absorbed and compensated by the bias in the braced area.

Preferably, in the support structure recesses and/or grooves are introduced as tension notches to remove tensions. The recesses and, resp., grooves prevent, during heating, a resulting tensile force from exceeding a maximum admissible tensile force.

According to another alternative embodiment, the corset structure may be arranged radially outside the area of the support structure indirectly supporting the cutting edge and radially inside the cutting edge. The corset structure thus is arranged in the radial direction between the cutting edge and the support structure. Hence, the corset structure is the structure which, vis-à-vis the supporting area indirectly supporting the cutting edge, in the radial direction is closer to the cutting edge. Due to the low thermal expansion coefficient of the corset structure, consequently a temperature change causes only a small change in position of the cutting edge so that the dimensional stability is maintained. Although the radially inner support structure expands, the preferably circumferentially adjacent corset structure restricts corresponding geometry-dependent transfer of the thermal expansion to the cutting edges. The corset structure is interconnected so-to-speak between the cutting edge and the support structure.

In the alternative embodiment, the at least one cutting edge may be positioned in most different ways. When the material of the corset structure is suited to form a hard cutting edge, the at least one cutting edge may be configured directly at the corset structure. Thus, the corset structure is formed integrally and inexpensively with the at least one cutting edge and mounting of the cutting edge to the corset structure is not necessary. The at least one cutting edge may alternatively be formed on a cutting member supported by the corset structure. The cutting member in this case forms a separate member, preferably a cutting insert, which is especially replaceable and may include a material of particularly increased hardness different from the corset structure.

Preferably, also in the further alternative embodiment the cutting member is held in an axially and/or radially adjustable cartridge. By means of the cartridge, a radial and/or axial position and/or an angular position of the cutting member and thus of the cutting edge can be modified. In particular, in the embodiment of the radially outwardly arranged corset structure, the cartridge rests directly on or is embedded in the corset structure.

In a preferred embodiment, the corset structure may have a structure ring-shaped with respect to the axis of rotation. The ring-shaped corset structure may be manufactured at low cost and may be arranged, preferably flanged, around a preferably circular or at least partly circular support structure.

It is advantageous when the corset structure and/or the support structure are designed in the area of the connection between the support structure and the corset structure so that a forced thermal expansion constraint is reduced. The corset structure constrains thermal expansion of the support structure in the area of the connection and, both in the support structure and in the corset structure, tensions occur which may result in plastic deformations, in material fatigue and, in the worst case, finally in disruption. In order to reduce the tension peaks, an area of the connection and especially the corset structure and/or the support structure are structurally designed, for example through an appropriately radially elastic portion, so that forced thermal expansion constraint is reduced and restricted radially elastic "play" will be formed in the area of the connection.

Preferably, the rotary tool may include at least one annular groove (an axial recess/a plane recess), especially preferred two annular grooves having radially different clearances in the area of the connection between the corset structure and the support structure. The at least one annular groove helps to remove material from the area so that elastic deformation is promoted. Especially two or more annular grooves are alternately withdrawn from the front and the rear side, when viewed from the axial direction, so that an S-shaped land is formed in the area of the connection when viewed in a longitudinal section. Said S-shaped land extends circumferentially and may preferably be formed in the corset structure and/or in the support structure.

BRIEF DESCRIPTION OF THE DRAWINGS

The invention shall be illustrated in detail by way of preferred example embodiments with the help of figures, wherein.

The Figures are schematic and are intended to serve merely for the comprehension of the invention. Like elements are provided with like reference numerals. The features of the various example embodiments may be exchanged for each other.

DETAILED DESCRIPTION OF PREFERRED EMBODIMENTS

Figure 1:
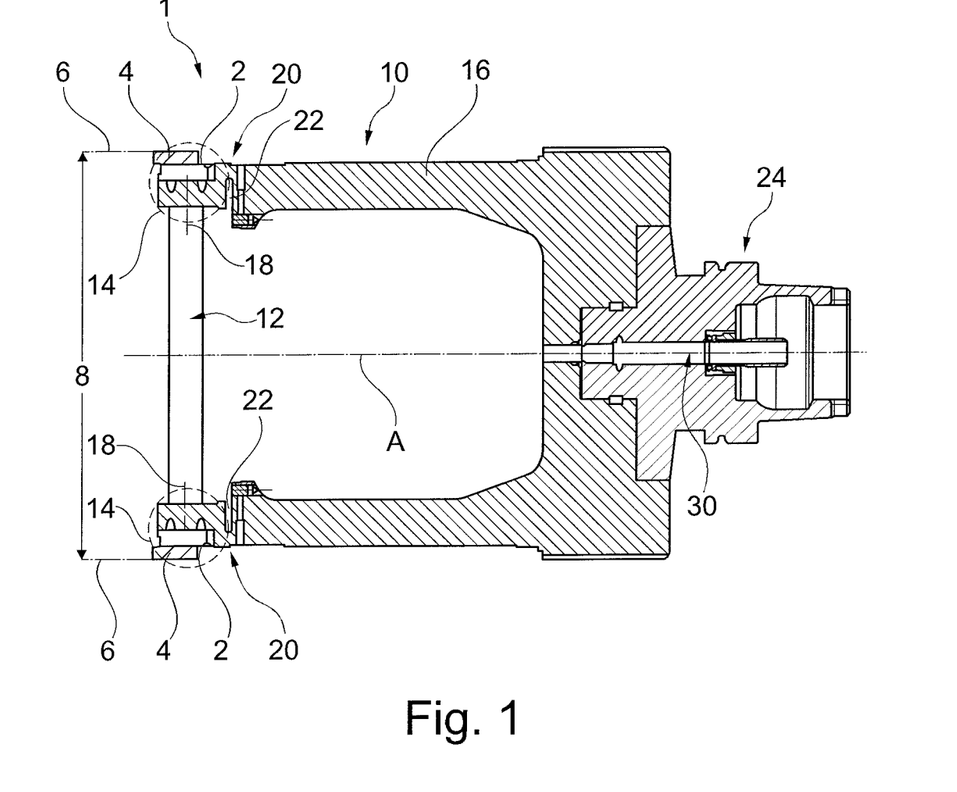
FIG. 1 shows a longitudinal section view of a rotary tool according to the invention of a first preferred embodiment including a radially inner corset structure.

FIG. 1 illustrates a rotary tool 1 according to the invention of a first preferred embodiment in a longitudinal section view. The rotationally driven rotary tool of this variant is designed to be rotationally symmetric about an axis of rotation A and serves for high-precision machining of particularly metallic components, components made from plastics or components of fiber-reinforced composite materials. For this purpose, at an outer circumference 2 of the rotary tool 1 cutting edges 4 are circumferentially arranged which, during rotation of the rotary tool about the axis of rotation A, remove material by cutting from a workpiece to be machined (not shown). Radially outer points of the cutting edges 4 at the outer circumference 2 during rotation about the axis of rotation A describe a circular cutting circle 6 having a related cutting circle diameter 8. Said cutting circle diameter 8 finally determines the resulting inside diameter of a workpiece to be machined.

The rotary tool 1 is designed for large inside diameters, for example the inside diameter of a stator housing. In this embodiment, the rotary tool 1 has a cutting circle diameter 8 of 300 mm. Equally, the rotary tool 1 is adapted to machine an inside diameter of an axial length of up to 400 mm. The rotary tool 1 designed for this purpose can provide the required high cutting performance and yet comply with the required narrow manufacturing tolerances, as will be explained below.

The rotary tool 1 has a support structure 10 in cup shape which spares material in the radially inner area and nevertheless ensures excellent torque transmission and stability. The support structure 10 has the greatest volume proportion in the rotary tool 1 and, therefore, is designed in light-weight construction, especially light-alloy construction. In particular, the support structure 10 may include aluminum such as e.g. AlZnMgCu1,5 (material number 3.4365) as a material. In this way, both the weight of the rotary tool 1 and the (rotational) inertia are reduced and handling is improved so as to enhance the effects on the dimensional stability of machining. Aluminum as a low-cost material for light-weight construction has the drawback, however, that its thermal expansion coefficient $\alpha_{Al}$ is $$24 \cdot 10^{-6} \frac{1}{K}.$$

The support structure 10 supports the cutting edges 4 at a left-hand area as viewed in FIG. 1. The rotating cutting edges 4 with high chip removal are strongly heated during workpiece machining and transfer the heat occurring to adjoining components of the rotary tool 1. The support structure 10, when being stand-alone, would strongly expand during machining and accompanying heating due to the large dimensions and the large cutting circle diameter 8 so that, depending on the difference in temperature, dimensional stability finally is no longer ensured. Therefore, according to the invention, the rotary tool 1 includes a corset structure 12 which restricts an area 14 of the support structure 10 supporting the cutting edge 4 with respect to thermal expansion. The supporting area 14 is a portion of the support structure 10 in the environment of the cutting edges 4 which supports the latter indirectly or directly and absorbs the forces occurring at the cutting edge 4 during machining, when viewed in the flux of force, as an upstream area of the support structure 10.

This is to say that an area 14 supporting the cutting edge 4, which is ultimately crucial to the cutting circle diameter 8 and substantially predetermines the latter, is limited by the corset structure 12 as to its change of position in the radial direction. While the support structure 10 is consequently limited in the area 14 supporting the cutting edge 4 as regards a change in geometry, the support structure 10 can expand thermally unhindered in the remaining area which is referred to as base 16 of the support structure 10. The corset structure 12 is arranged radially inside the cup-shaped support structure 10 in a left-hand portion as viewed in FIG. 1. Thus, the corset structure 12 is in direct vicinity to the area 14 supporting the cutting edge 4 and, resp., in radial extension of the cutting edges 4. The support structure 10 was shrink-fitted onto the corset structure 12 and at room temperature has a pretension toward the axis of rotation A.

The corset structure 12 takes the shape of a rotationally symmetric star (see FIG. 2) and is rigidly connected to the support structure 10 via screws and, resp., screwed connections 18 (schematically shown) in the radial direction, as a connecting element between the support structure 10 and the corset structure 12. Each point 44 of the star-shaped corset structure 12 (cf. FIG. 2) is adjacent to an inner circumference of the support structure 10 and is tightly connected by a respective screw 18. Via the screws 18, the corset structure 12 absorbs tensions in the radial direction which may occur due to different thermal expansion and "pulls" or retains the area 14 supporting the cutting edge 4 radially inwardly. In this way, merely thermal expansion of the supporting area 14, of the "wall" of the cup of the support structure 10, is relevant which is low, however, due to the small "wall thickness" of the supporting area 14 and the proportionality to the length.

The corset structure 12 in this embodiment is entirely made from Invar (steel), also known by the designation "Invar 36" or the material number 1.3912 and constitutes a low-expansion alloy. Its density is barely $$8 \frac{g}{cm^3}$$

and therefore it is heavier than the support structure 10 made from aluminum which has a larger volume. However, the specific thermal expansion coefficient $$\alpha_I = 2 \cdot 10^{-6} \frac{1}{K}$$

of the corset structure 12 is significantly lower than that of the support structure 10. Since the dimension of the corset structure 12 in the radial direction is many times larger than the radial dimension of the support structure 10, the corset structure 12 having the lower thermal expansion coefficient significantly predetermines the thermal expansion in the radial direction and, resp., by the fixed connection of the supporting area 14 via the screws 18 limits the supporting area 14 of the support structure 10. This helps to ensure dimensional stability even with great changes in temperature.

The supporting area 14 is connected to the base 16 via a radially elastic connecting portion 20. The elasticity in the radial direction and, resp., a defined elastic play in the radial direction enables, to a certain degree, a change in the geometry of the base 16 vis-à-vis the supporting area 14 to be uncoupled in the radial direction. The connecting portion 20 in this embodiment is a segment of the support structure 10 and has an inner circumferential groove 22. The inner circumferential groove 22 causes material to be removed from the connecting portion and radially elastic deformability to be promoted. As an alternative, in the connecting area 20 not only an inner circumferential groove 22 can be introduced, but, in addition thereto, also an axially offset (offset in the axial direction of the axis of rotation A) further outer and/or inner circumferential groove can be formed in the same. This helps to further increase radial elasticity, and via the geometric design of the connecting portion (number of inner and/or outer circumferential grooves, radial dimension of the grooves, widths of the grooves) a predetermined customized radial elasticity can be adjusted. The radially elastic connecting portion 20 is formed in one piece in this embodiment. Alternatively, the radially elastic connecting portion 20 may as well be a material portion formed in the support structure 10 and being delimited in a defined manner which has a lower E modulus in order to impart a radially elastic property to the material itself. It is likewise possible to introduce longitudinal slots and cutouts/slotted holes in the axial direction to the support structure 10 and especially to the base 16. The longitudinal slots help to split an annular structure of the support structure 10 which before was completely circumferentially closed into individual portions in the form of a crown which are spaced in the circumferential direction by the longitudinal slots and are more elastic in the radial direction.

The cup-shaped base 16 of the support structure 10 is connected to a chucking portion, which is a separate component in this case, and is rotationally and axially fixed in the same. The chucking portion 24 serves for chucking the rotary tool into an appropriate tool holder (not shown) which positions and rotates the rotary tool for machining. The chucking portion may be shaped in such way that it can be coupled to the corresponding spindle of a machine tool through common tool holders. In the shown case, the chucking portion is designed for a so-called hollow shank taper interface which may be configured for internal coolant/lubricant supply. Concretely speaking, the chucking portion 24 includes a feed tube 32 for coolant/lubricant.

Figure 2:
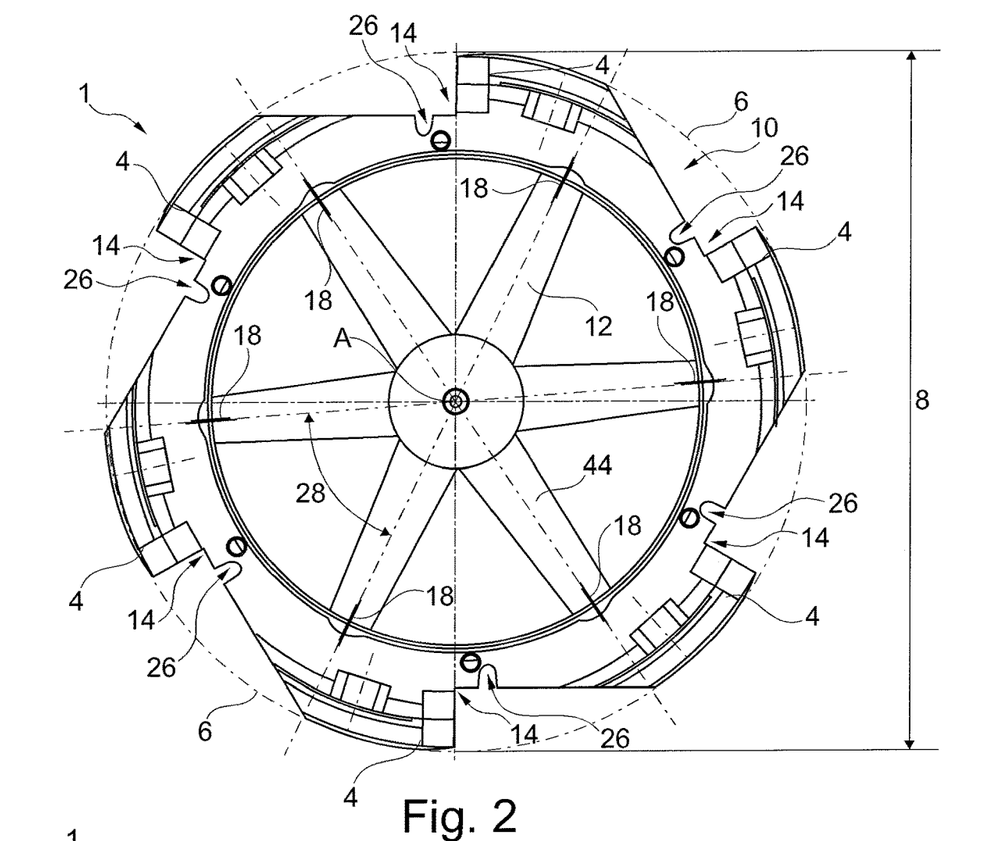
FIG. 2 shows a front view of a front portion of the rotary tool from FIG. 1.

FIG. 2 shows a front view of the rotary tool 1 according to the invention of the first embodiment from FIG. 1. In the front view the rotationally symmetric design of the rotary tool 1 is visible. More exactly speaking, the rotary tool 1 is divided into six circular portions/sections 28 of equal design which are arranged to be rotated at an angle of 60° relative to each other about the axis of rotation A and thus altogether define the entire cross-section of the rotary tool 1 over 360°.

In the rotary tool 1 the star-shaped corset structure 12 having six points 44 each pointing radially outwardly into the area 14 supporting the cutting edge 4 are arranged radially inside. In total, the rotary tool 1 comprises, in conformity with the number of points 44 and, resp., the number of circle segments 28, six cutting edges 4. Alternatively, the corset structure 12 may as well be in the form of a circular disk. The support structure 10 includes, when viewed in the circumferential direction, between the cutting edges 4 a respective recess 26 or a groove in the axial direction which serves as tension notch in order to dissipate tensions. The corset structure 12 especially has a diameter of more than 160 mm, especially preferred of more than 200 mm.

Figure 3:
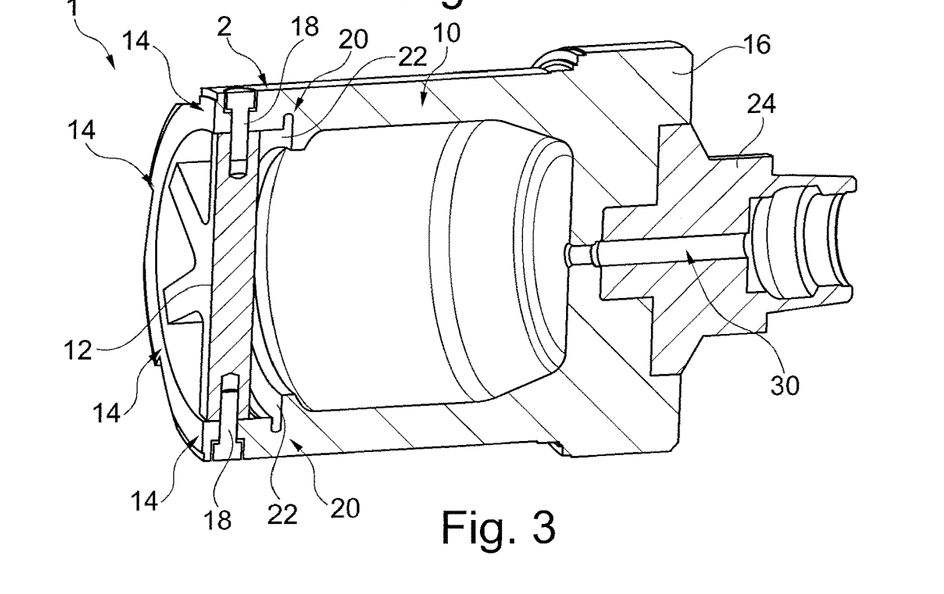
FIG. 3 shows a perspective view of the rotary tool in longitudinal section of the first preferred embodiment.

FIG. 3 illustrates, in a perspective longitudinal section view, the rotary tool 1 from FIGS. 1 and 2, wherein no cutting edges 4 are shown. In this view, the corset structure 12 and the screws 18 are clearly visible. Around the axis of rotation A, the rotary tool 1 includes a through-bore 30 for receiving a coolant/lubricant feed tube in the area of the chucking portion 24 and in a directly adjoining area of the support structure 10.

Figure 4:
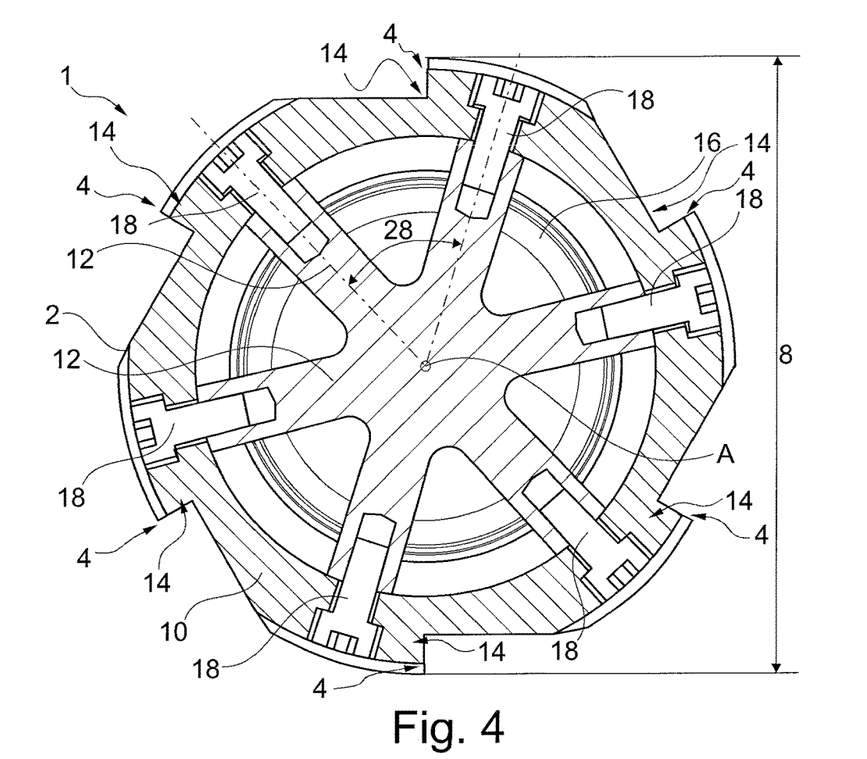
FIG. 4 shows a sectional view across the corset structure and the support structure of the rotary tool of the first preferred embodiment.

FIG. 4 illustrates a section across the star-shaped corset structure 12 comprising the six schematically shown cutting edges 4 of the six circle segments 28. The heads of the screws 18 are countersunk into the support structure 10 and end with the support structure 10 in the radial direction. The dimension of the star-shaped corset structure 12 in the axial direction amounts to less than 15 mm.

Figure 5:
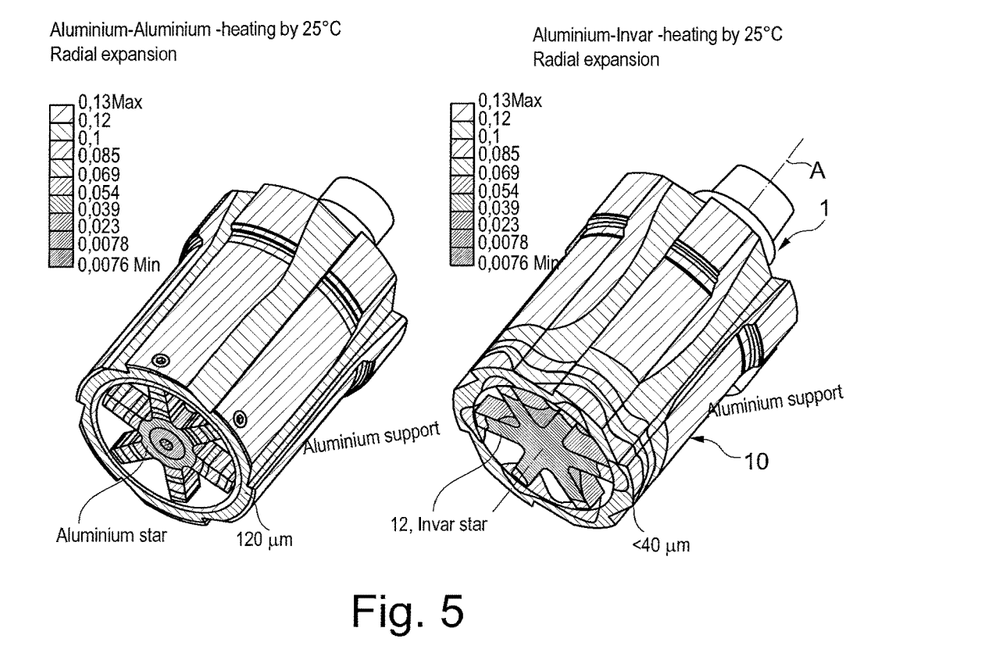
FIG. 5 shows a comparison of a temperature-dependent expansion of a rotary tool, in which radially inside an aluminum star is arranged, with a rotary tool according to the invention comprising a corset structure.

FIG. 5 illustrates a comparison of an expansion in the supporting area 14 and, resp., in the functional area of the cutting edges 4 (not shown) on the basis of a finite element model. It exemplifies for a temperature change of 25° C. a thermally caused change in shape of the tool and expresses in which way the cutting circle diameter 8 varies in a rotary tool having a star made from aluminum as a radially inner structure (left-hand part of FIG. 5) and in a rotary tool according to the invention comprising a corset structure from FIG. 3 (right-hand part of FIG. 5). The comparison clearly illustrates that in the rotary tool 1 according to the invention, when heated by 25° C., a radial widening of the area 14 supporting the cutting edge 4 and thus of the cutting circle diameter 8 is significantly smaller than in the star made from aluminum. FIG. 5 primarily serves for illustrating the qualitative change of thermal expansion when a corset structure 12 made from Invar is used. In the specific simplified model, in which the radially elastic connecting portion has not been subjected to further optimization and in which a nominal diameter of the support structure of more than 220 mm was used, a local widening at the front area is reduced from 120 µm to less than 40 µm. The thermally caused change of position of the cutting edges 4 is preferably minimized by imparting such shape to the support structure 10 as compared to the corset structure 12 that the corset structure 12 is efficiently capable of reducing the thermal expansion of the support structure 10 especially in the area where the cutting edges 4 are positioned.

Figure 6:
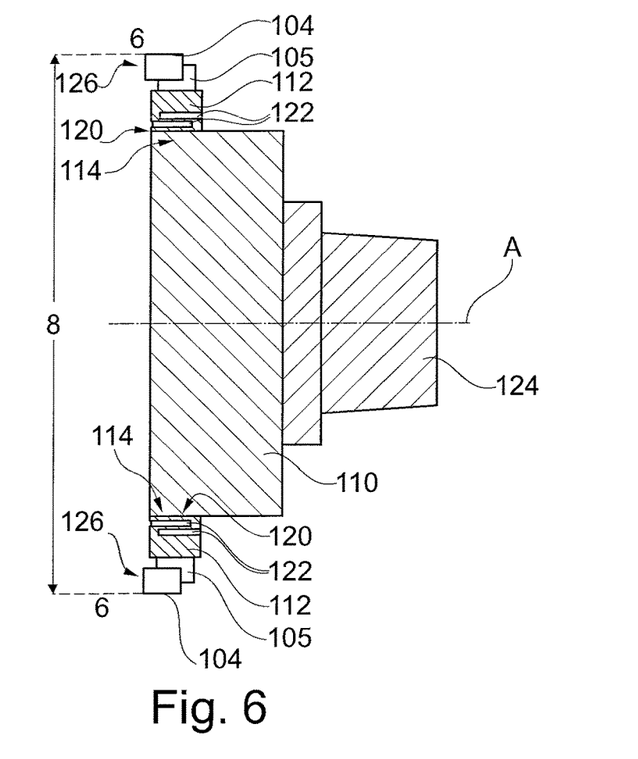
FIG. 6 shows a schematic longitudinal section of a rotary tool according to the invention of a second preferred embodiment.
Figure 7:
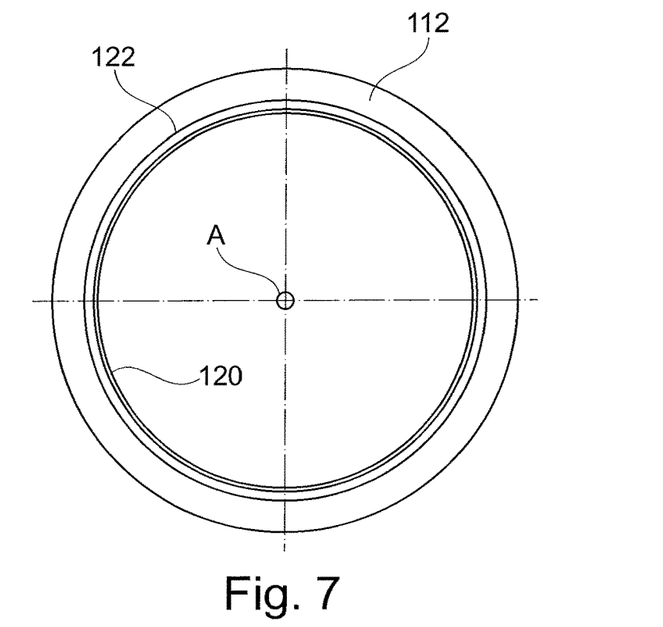
FIG. 7 shows a schematic front view of the rotary tool from FIG. 6.

FIG. 6 shows a longitudinal section across a rotary tool 101 according to the invention of a further second preferred embodiment. FIG. 7 shows in a front view the stand-alone ring-shaped corset structure 112 from FIG. 6.

In the second embodiment (FIG. 6) a support structure 110 is arranged radially inside with respect to the corset structure 112 and, resp., the corset structure 112 rests radially outside on the support structure 110. The corset structure 112 has a ring-shaped structure with respect to the axis of rotation A of the rotary tool 101. At its outer periphery 2, the rotary tool 101 includes plural cutting edges 104. In contrast to the first embodiment, here the cutting edges 104 of a cutting member 126 are held and embedded in respective cartridges 105 and rest on the corset structure 112. This means that, in the second embodiment, an area 114 supporting the cutting edges 104 is a radially inner portion of the support structure 110 which supports the cutting edges 4 indirectly via the corset structure 112, the cartridges 105 and the cutting member 126. The cutting member 126 in this embodiment is a cutting insert made from carbide and has a coating in the area of the cutting edge 104. The corset structure 112 in the form of a closed ring is completely manufactured, by way of example, as a titanium alloy which has a low thermal expansion coefficient of $\alpha_{Ti}=8\cdot10^{-6}$ 1/K. The schematically shown cartridges 105 enable the cutting edges 104 to be individually adapted in the axial and radial directions. The cutting edges 104 define, similarly to the first embodiment, a cutting circle 6 having a cutting circle diameter 8 of the cutting rotary tool 101.

The ring-shaped corset structure 112 (cf. also FIG. 7) includes, in its radially inner portion and thus in an area of the connection 120, two annular grooves 122 and two axial recesses/plane recesses from a respective left and right side, when viewed in FIG. 6, which have a different radial distance from the axis of rotation A. Concretely, one of the two annular grooves 122 is inserted, when viewed in FIG. 6, from the left or front side and the other annular groove 122 is inserted from the right or rear side into the corset structure 112 and, in the longitudinal section view, they form a land of S-shaped structure. Said two annular grooves 122 serve for a radially elastic configuration of the radially inner area of the corset structure 112 and thus of the area of the connection 120 to the support structure 110. In this way, the support structure 110 may expand in the case of temperature changes without a forced thermal expansion constraint excessively loading and, in the worst case, disrupting the corset structure 112. The annular corset structure 112 is radially flanged to the support structure 110.

Alternatively, instead of the titanium alloy also Invar can be used as a material for the corset structure 112. Alternatively, or additionally, the annular grooves 122 may also be introduced to the supporting area 114 of the support structure 110. Alternatively, or additionally, the support structure 110 may be geometrically designed such that, due to its geometry, a radially elastic configuration of the area of the connection 120 is provided. For example, the support structure 110 may again be cup-shaped and, additionally, circumferentially in the area of the cutting edges longitudinal cuts may be introduced in the axial direction to the wall of the support structure 110.

A chucking portion 124 may take any shape and may preferably take such shape that it can be coupled through a hollow shank taper seat.

Figure 8:
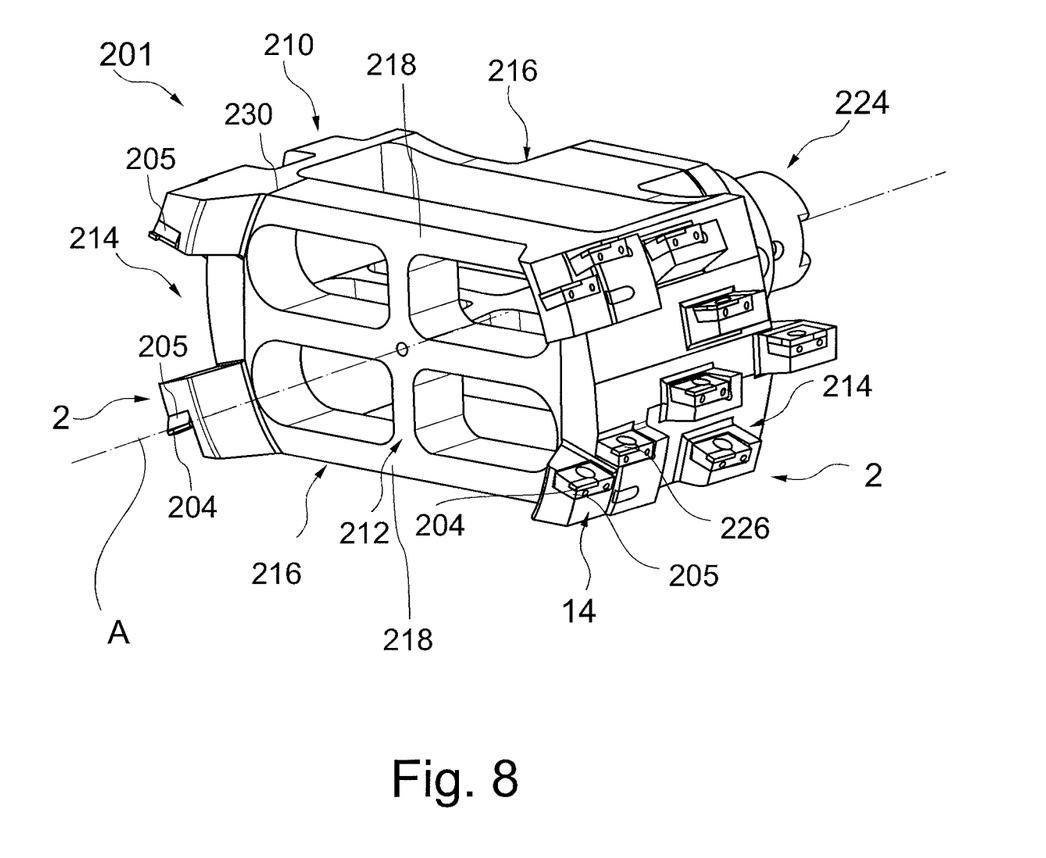
FIG. 8 shows a perspective view of a rotary tool according to the invention of a further, third preferred embodiment.

FIG. 8 illustrates a further, third preferred embodiment of a rotary tool 201 according to the invention. In this Figure, too, for a simplified description, those components of the parts of the afore-described other embodiments are correspondingly provided with similar reference numerals which are preceded by "2". The rotary tool 201 again includes, in conformity with the foregoing embodiments, at its outer periphery 2 cutting edges 204 at cutting members 226 in the form of cutting inserts which are held in axially and radially adjustable cartridges 205. The cutting edges 4 are supported by two radially outer and diametrically opposed supporting areas 214 of a support structure 210. The support structure 210 in this third embodiment is not in the form of a circular cup but rather in the form of a cup having cut-off sides 216 which are diametrically opposed with respect to the axis of rotation. The cut-off sides 216 serve for improving the handling in logistics and storage of the rotary tool in the machining centers. The cutting edges 4 of the front portion of the supporting structure 214 include, radially inside separated via a separating line 230, a corset structure 212 made from Invar in star-shaped structure connected to the two supporting areas 214. Concretely speaking, the star-shaped structure is latticed, when viewed in the axial direction, and, apart from a "main star" in the center, includes two further struts 218 which interconnect the two supporting areas 214. The corset structure 212 helps to limit thermal expansion of the supporting areas 214 in a front portion of the support structure 210 in the radial direction. The geometry of the support structure 210, which is U-shaped in a lateral view, with a radially inner corset structure 212 helps to design the support structure 210 in light-weight construction.

Figure 9:
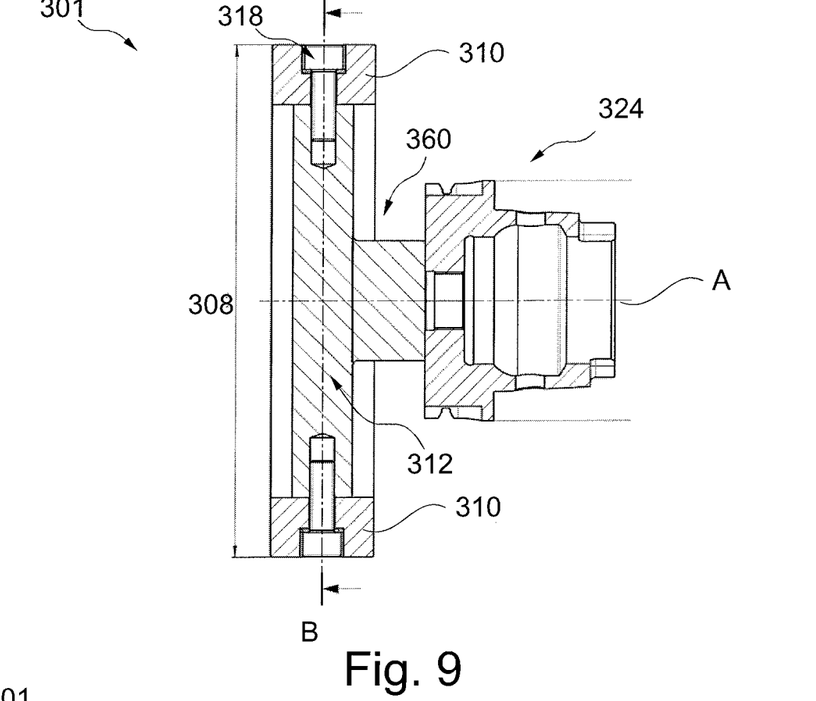
FIG. 9 shows a schematic longitudinal sectional view of a rotary tool of a further, fourth preferred embodiment.
Figure 10:
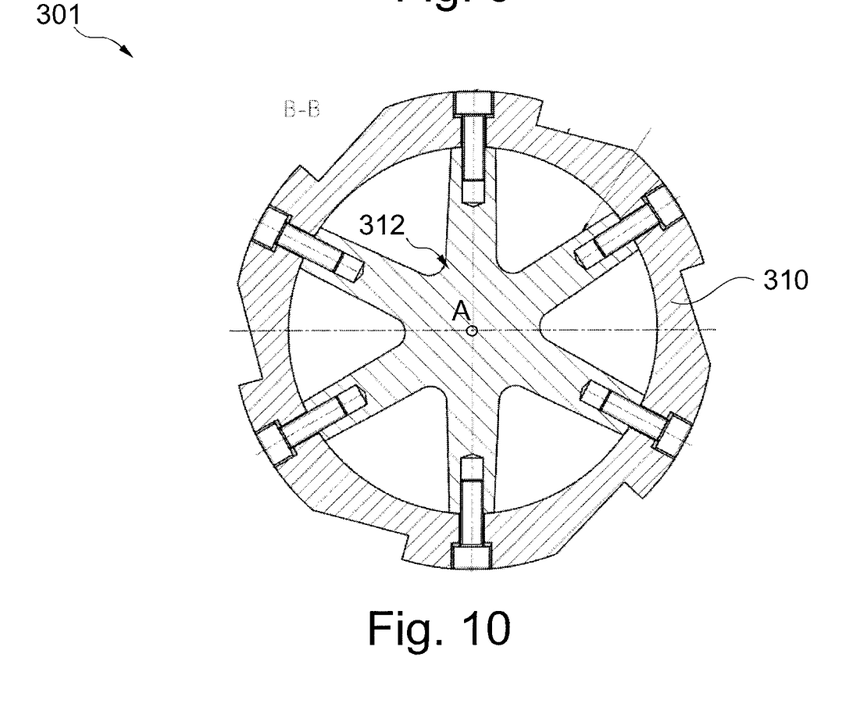
FIG. 10 shows a schematic cross-sectional view of the rotary tool from FIG. 9.

FIG. 9 and FIG. 10 finally illustrate another embodiment of a rotary tool 301 for machining large inside diameters. In this variant, too, elements corresponding to components of the afore-described embodiments are provided with similar reference numerals which are preceded by "3".

In this case, the support structure 310 is configured merely as a light-metal ring, for example as an aluminum ring, which rests on a corset structure 312 and supports the cutting edges 304. The corset structure 312 may take any shape, for example a star or a disk shape. The material used for the corset structure 312 again is a material of low thermal expansion, such as the afore-described materials. In this variant, the torque transmission from the chucking portion 324 to the corset structure 312 is carried out via a merely schematically indicated shaft portion 360 which can be freely designed as to its dimensioning and geometry. Said shaft portion 360 may also support a further corset structure (not shown) for another light-metal ring equipped with cutting edges. In this case it is advantageous when the shaft portion 360 is equally made from a material having a low thermal expansion coefficient such as e.g. Invar.

The connection between the corset structure 312 and the support structure 310 in the form of a light-metal ring may correspond to the one described with reference to the embodiments according to FIGS. 1 to 5. In addition, the light-metal ring may be shrink-fitted onto the corset structure 312, which offers the advantage that, when the tool is heated, the thermally caused change of position of the cutting edges (not shown) resting on the light-metal ring at the outer periphery of the light-metal ring is partly compensated initially by the reduction of shrinkage expansion.

The particular advantage of this embodiment can be perceived in the fact that the cutting edges (not shown) of the rotary tool 301 can be randomly distributed over the circumference, independently of the geometric shape of the corset structure 312. Also, the weight can be further reduced.

Figure 11:
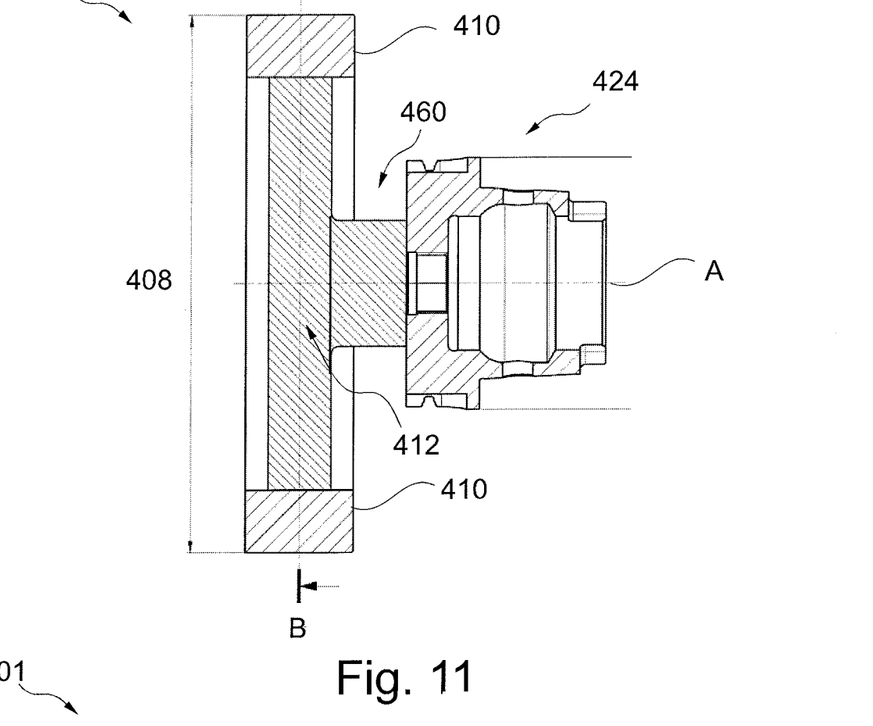
FIG. 11 shows a schematic longitudinal section view of a rotary tool of a further, fifth preferred embodiment.

The embodiment of a rotary tool 401 according to FIG. 11 and FIG. 12, in which again similar reference numerals, preceded by "4", are used, differs from the variant according to FIG. 9 and FIG. 10 by the fact that the radially fixed connection between the support structure 410 and the corset structure 412 is established merely non-positively by shrinking the support structure 410 onto the corset structure 412. It is another modification that the corset structure is not designed as a star but similarly to a rim having a circumferential closed backing ring 440 so that the support structure 410 supports against the corset structure 412 over the entire circumference.

Figure 12:
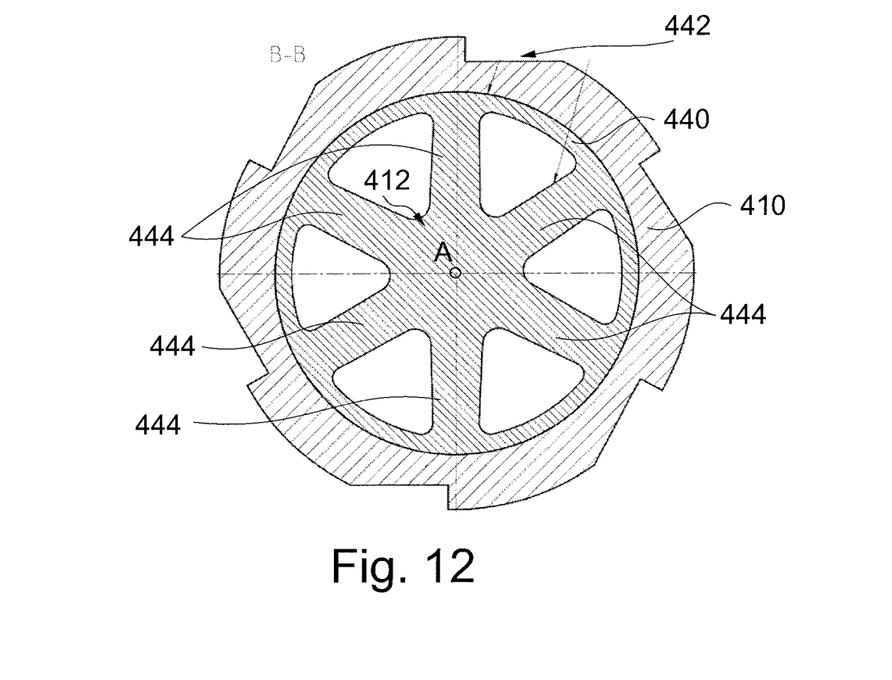
FIG. 12 shows a schematic cross-sectional view of the rotary tool from FIG. 11, and FIGS. 13 & 14 show a comparison of a temperature-dependent expansion of a rotary tool, in which radially inside an aluminum wheel is arranged, with the rotary tool of the fifth embodiment comprising a corset structure made from Invar.

The cutting edges (not shown) of the tool are distributed over the circumference. Also flattened portions 442 are provided on which the cutting edges and, resp., cartridges are fixed. The flattened portions 442 are preferably provided in areas where the corset structure 412 has a maximum influence on the limitation of the thermal expansion. In the shown embodiment, this is the area close to the spokes 444 of the corset structure 412.

Preferably, the flattened portion 442 is positioned as closely as possible to the connecting area and, resp., the contact face between the corset structure 412 and the support structure 410.

It is pointed at the fact that the general concept described in connection with FIGS. 1 to 12 of a light-metal support structure, for example in the form of a light-metal ring, which is shrink-fitted onto a corset structure having a low thermal expansion coefficient and which supports the cutting edges constitutes an independent invention which may be rendered the subject matter of a separate patent application, where appropriate.

Figure 13:
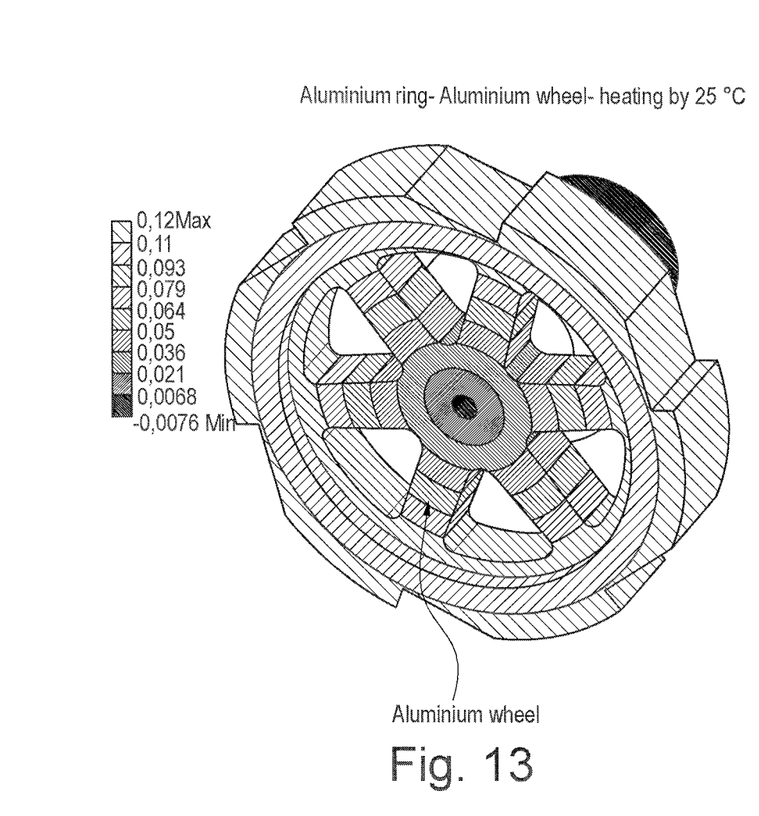
Figure 14:
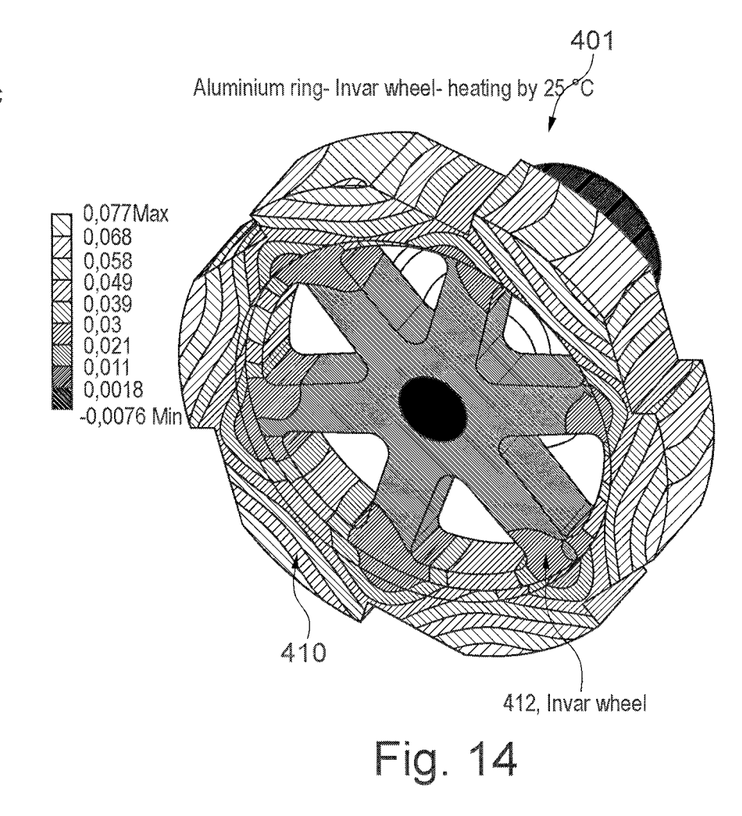

In FIGS. 13 and 14, thermally caused expansions of a tool according to the application (FIG. 14) as shown in FIGS. 11 and 12 are compared to the thermal deformations of a tool completely made from light metal (FIG. 13). In both cases, a light-metal ring, in this case an aluminum ring, is shrink-fitted onto a corset structure in the form of a wheel or a rim. The marker/hatching allows to recognize, in combination with the marking scale, the thermally caused expansion of the individual areas in the case of temperature increase of 25° C. As is evident, the aluminum ring according to FIG. 13 expands at the outer periphery by 120 µm, whereas in the configuration according to the application the radial displacement of the outermost portion of the aluminum ring (support structure) can be limited to less than 40 µm. Moreover, it is evident that said limitation of the radial expansion is the lower, the closer the relevant point is to the axis of rotation. Thus, the thermally caused displacement of a cutting edge supported by a light-metal ring in the case of increase in the tool temperature can be even further reduced, when the cutting edge is located in a cartridge, for example, which is fastened on the flattened portion 442 of the aluminum ring.

The result shown in the FIGS. 13 and 14 can be achieved, in a manner comparable as to quality, even if a star or a star-shaped corset structure to which the support structure is shrink-fitted is used instead of the wheel or the rim.

As a matter of course, also modifications of the afore-described embodiment are possible without leaving the basic idea of the invention.

For example, the rotary tool need not be designed to be rotationally symmetric with equal sections but may be as well divided unequally and may include different circle segments/sections which are differently angled relative to each other about the axis of rotation A. For example, a first section having an angle of 25° about the axis of rotation A, a second section having an angle of 25° and being designed differently from the first section and a third section having an angle of 130° can define a respective half of the rotary tool. Hence, the sections altogether define again the entire cross-section of the rotary tool 1 over 360° by (25°+25°+ 130°)+(25°+25°+130°).

Further, instead of Invar or a titanium alloy, generally any material having a low thermal expansion coefficient (of less than 10 E−6 1/K) can be used.

The rotary tool can be generatively or, resp., additively manufactured on the whole or in a modular way. For example, portions of the rotary tool may include different materials which are formed by means of (metal) laser sintering, for example, and are interconnected. In a variant, the support structure and/or the corset structure may be additively manufactured and interconnected using equal or different materials such as e.g. Invar or a titanium alloy.

REFERENCE NUMERALS

1; 101; 201; 301; 401 rotary tool
2 outer circumference
4; 104; 204 cutting edge
6 cutting circle
8 cutting circle diameter
10; 110; 210; 310; 410 support structure
12; 112; 212; 312; 412 corset structure
14; 114; 214; 314 supporting area
16 base
18 screw
20 connecting portion
22 inner circumferential groove
24; 124; 224; 324; 424 chucking portion
26 recess
28 circle segment
30 through-bore
32 feed tube
105; 205 cartridges
120 area of connection
122 annular groove
126; 226 cutting member
360 shaft portion
440 backing ring
442 flattened portion
44; 344; 444 spoke/point
A axis of rotation

The invention claimed is:

1. A rotary tool for cutting large inside diameters at the outer circumference of which at least one cutting edge is arranged, comprising a support structure which includes a supporting area which indirectly or directly supports the cutting edge, and comprising a chucking portion for coupling to a tool holder, wherein the support structure is designed in light-weight construction and the area of the support structure indirectly or directly supporting the cutting edge is limited with respect to thermal expansion by a corset structure, wherein the corset structure has a thermal expansion coefficient of less than 10E-6 1/K within the temperature range from 0 to 100° C., wherein the corset structure is arranged radially inside the support structure and is connected to the support structure, and wherein the corset structure predetermines a thermal expansion of the area of the support structure supporting the cutting edge.

2. The rotary tool according to claim 1, wherein the corset structure includes Invar and/or titanium and/or nickel and/or carbon-fiber reinforced plastic as a material.

3. The rotary tool according to claim 1, wherein the corset structure is formed to be rotationally symmetric to an axis of rotation of the rotary tool.

4. The rotary tool according to claim 1, wherein the support structure has a density of less than 4 g/cm³ and/or a thermal expansion coefficient of more than 15E-6 1/K within the temperature range from 0 to 100° C.

5. The rotary tool according to claim 1, wherein the rotary tool is adapted for machining an inside diameter of more than 200 mm.

6. The rotary tool according to claim 1, wherein the rotary tool is adapted for machining an inside diameter having a length of up to 400 mm.

7. The rotary tool according to claim 1, wherein the at least one cutting edge is formed directly at the supporting area of the support structure or at a cutting member supported by the supporting area.

8. The rotary tool according to claim 7, wherein the cutting member is held in an axially and/or radially adjustable cartridge.

9. The rotary tool according to claim 1, wherein the corset structure has a disk-shaped or star-shaped structure with respect to an axis of rotation of the rotary tool.

10. The rotary tool according to claim 1, wherein the area supporting the cutting edge is connected to a base of the support structure via a radially elastic connecting portion.

11. The rotary tool according to claim 10, wherein the base of the support structure is cup-shaped and the radially elastic connecting portion of the support structure includes an inner circumferential groove and/or an outer circumferential groove.

12. The rotary tool according to claim 1, wherein the corset structure is arranged radially outside the area of the support structure indirectly supporting the cutting edge and radially inside the cutting edge.

13. The rotary tool according to claim 12, wherein the at least one cutting edge is formed directly at the corset structure or at a cutting member supported by the corset structure.

14. The rotary tool according to claim 13, wherein the cutting member is held in an axially and/or radially adjustable cartridge.

15. The rotary tool according to claim 12, wherein the corset structure has a structure ring-shaped with respect to the axis of rotation.

16. The rotary tool according to claim 12, wherein the support structure and/or the corset structure is/are designed in the area of the connection between the support structure and the corset structure so that a forced thermal expansion constraint is reduced.

17. The rotary tool according to claim 12, wherein in the area of the connection between the corset structure and the support structure, the rotary tool includes at least one annular groove.

18. The rotary tool according to claim 12, wherein in the area of the connection between the corset structure and the support structure, the rotary tool includes two annular grooves with radially different clearances.

19. The rotary tool according to claim 1, wherein the corset structure includes carbon-fiber reinforced plastic as a material and the carbon fibers are laid in a radial direction of the rotary tool so that thermal expansion is restricted in the fiber direction.

20. The rotary tool according to claim 1, wherein the dimension of the corset structure in the radial direction is from two to twenty times larger than the dimension of the area supporting the cutting edge in the radial direction.

21. The rotary tool according to claim 1, wherein the corset structure is connected to the support structure via screws in the radial direction, wherein the screws are arranged circumferentially uniformly.

22. A rotary tool for cutting large inside diameters at the outer circumference of which at least one cutting edge is arranged, comprising a support structure which includes a supporting area which indirectly or directly supports the cutting edge, and comprising a chucking portion for coupling to a tool holder, wherein the support structure is designed in light-weight construction and the area of the support structure indirectly or directly supporting the cutting edge is limited with respect to thermal expansion by a corset structure, wherein the corset structure includes Invar as material, wherein the area supporting the cutting edge is connected to a base of the support structure via a radially elastic connecting portion and the base of the support structure is cup-shaped and the radially elastic connecting portion of the support structure includes an inner circumferential groove and/or an outer circumferential groove.

23. The rotary tool according to claim 22, wherein the corset structure is formed to be rotationally symmetric to an axis of rotation of the rotary tool.

24. The rotary tool according to claim 22, wherein the support structure has a density of less than 4 g/cm$^3$.

25. The rotary tool according to claim 22, wherein the corset structure has a disk-shaped or star-shaped structure with respect to an axis of rotation of the rotary tool.

26. The rotary tool according to claim 22, wherein the dimension of the corset structure in the radial direction is from two to twenty times larger than the dimension of the area supporting the cutting edge in the radial direction.

* * * * *